US011942685B2

(12) United States Patent
Ueda et al.

(10) Patent No.: US 11,942,685 B2
(45) Date of Patent: Mar. 26, 2024

(54) COMMUNICATION DEVICE

(71) Applicant: Murata Manufacturing Co., Ltd., Nagaokakyo (JP)

(72) Inventors: Hideki Ueda, Nagaokakyo (JP); Yasuhisa Yamamoto, Nagaokakyo (JP); Masashi Omuro, Nagaokakyo (JP); Kazunari Kawahata, Nagaokakyo (JP); Satoshi Tanaka, Nagaokakyo (JP); Ryuken Mizunuma, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 234 days.

(21) Appl. No.: 17/673,798

(22) Filed: Feb. 17, 2022

(65) Prior Publication Data

US 2022/0173508 A1 Jun. 2, 2022

Related U.S. Application Data

(63) Continuation of application No. PCT/JP2020/026727, filed on Jul. 8, 2020.

(30) Foreign Application Priority Data

Aug. 19, 2019 (JP) ................................ 2019-149899

(51) Int. Cl.
*H01Q 1/52* (2006.01)
*H01Q 5/307* (2015.01)
*H01Q 13/08* (2006.01)

(52) U.S. Cl.
CPC ............ *H01Q 1/523* (2013.01); *H01Q 5/307* (2015.01); *H01Q 13/08* (2013.01)

(58) Field of Classification Search
CPC ...... H01Q 1/523; H01Q 13/08; H01Q 21/065; H01Q 1/38; H01Q 1/40; H01Q 1/42;
(Continued)

(56) References Cited

U.S. PATENT DOCUMENTS

2015/0325922 A1* 11/2015 Fujita ...................... H01Q 3/16
343/753

FOREIGN PATENT DOCUMENTS

CN 205900780 U * 1/2017
CN 205900780 U 1/2017
(Continued)

OTHER PUBLICATIONS

Office Action dated Aug. 23, 2022, in corresponding Japanese patent Application No. 2021-540661, 6 pages.
(Continued)

*Primary Examiner* — Monica C King
(74) *Attorney, Agent, or Firm* — XSENSUS LLP

(57) ABSTRACT

A first antenna, a second antenna, and a waveguide structure are housed in a single cabinet. An operating frequency of the second antenna is higher than an operating frequency of the first antenna. The second antenna is an array antenna including a plurality of radiating elements. The waveguide structure is present outside a range of a half-value angle of a main beam as viewed from the first antenna, includes a unit waveguide disposed in a route of a radio wave received by the second antenna, and further attenuates a radio wave with the operating frequency of the first antenna.

20 Claims, 10 Drawing Sheets

(58) Field of Classification Search
CPC ...... H01Q 1/521; H01Q 21/064; H01Q 21/24; H01Q 21/30; H01Q 5/30; H01Q 5/307; H01Q 5/42; H01Q 9/065
See application file for complete search history.

(56) References Cited

FOREIGN PATENT DOCUMENTS

| | | | |
|---|---|---|---|
| JP | 2000-514614 | A | 10/2000 |
| JP | 2005-505963 | A | 2/2005 |
| JP | 4516246 | B2 * | 8/2010 |
| WO | 2006/011412 | A1 | 2/2006 |
| WO | 2018/076491 | A1 | 5/2018 |
| WO | 2018/115372 | A1 | 6/2018 |
| WO | 2019/054094 | A1 | 3/2019 |

OTHER PUBLICATIONS

English Translation of Written Opinion dated Oct. 6, 2020, issued in corresponding International Application No. PCT/JP2020/026727, 3 pp.
International Search Report and Written Opinion dated Oct. 6, 2020, received for PCT Application PCT/JP2020/026727, Filed on Jul. 8, 2020, 8 pages including English Translation.

* cited by examiner

COMMUNICATION DEVICE

CROSS-REFERENCE TO RELATED APPLICATIONS

This application claims priority to PCT/JP2020/026727, filed Jul. 8, 2020, which claims priority to JP 2019-149899, filed Aug. 19, 2019, the contents of both of which are incorporated by reference in their entirety.

TECHNICAL FIELD

The present invention relates to a communication device that operates at two or more frequencies.

BACKGROUND ART

Patent Document 1 below discloses a planar array antenna that operates at two frequencies. This antenna includes first and second planar array antenna units stacked in layers. The first planar array antenna unit operates in a relatively low frequency band and the second planar array antenna unit operates in a relatively high frequency band. The first planar array antenna unit is disposed on the second planar array antenna unit. A ground surface is disposed between the first planar array antenna unit and the second planar array antenna unit. A patch and the ground surface of the first planar array antenna unit have frequency selectivity that is transparent to the operating frequency band of the second planar array antenna unit. In addition, the ground surface reflects the radio waves with the operating frequency of the first planar array antenna unit.

CITATION LIST

Patent Document

Patent Document 1: Japanese Unexamined Patent Application Publication (Translation of PCT Application) No. 2000-514614

SUMMARY

Technical Problem

In the conventional antenna, the patch and the ground surface of the first planar array antenna unit disposed on the second planar array antenna unit are provided with a plurality of holes so as to be transparent to the operating frequency of the second antenna unit. However, it is difficult to make the patch and the ground surface of the first planar array antenna unit electrically transparent completely. Here, "electrically transparent" means that the effect on the radio waves is almost the same as in air. Accordingly, the radio waves transmitted and received by the second planar array antenna unit are attenuated to some extent by the patch and the ground surface of the first planar array antenna unit.

If the two antennas are disposed side by side without being overlapped with each other, the radio waves transmitted and received by one antenna are less affected by the other antenna. However, when the radio waves emitted from the antenna for the low frequency band is received by the antenna for the high frequency band and a harmonic wave is generated when the reception signal is processed, the harmonic wave becomes noise for the reception signal of the radio waves in the high frequency band.

One object of the present disclosure is to provide a communication device that has two antennas that operate at different frequencies and can reduce the effect of the harmonic wave of the reception signal on the communication of the antenna for the high frequency band, the harmonic wave of the reception signal being emitted from the antenna for the low frequency band and received by the antenna for the high frequency band.

Solution to Problem

According to an aspect of the present disclosure, there is provided a communication device including a first antenna, a second antenna, and a waveguide structure that are housed in a single cabinet, in which an operating frequency of the second antenna is higher than an operating frequency of the first antenna, the second antenna is an array antenna including a plurality of radiating elements, and the waveguide structure is present outside a range of a half-value angle of a main beam as viewed from the first antenna, includes a unit waveguide disposed in a route of a radio wave received by the second antenna, and further attenuates a radio wave with the operating frequency of the first antenna than a radio wave with the operating frequency of the second antenna.

Advantageous Effects

The waveguide structure attenuates the radio waves with the operating frequency of the first antenna before the radio waves with the operating frequency of the first antenna are reflected by the radio wave reflector and received by the second antenna. Therefore, even if a harmonic wave of the reception signal is generated after being received by the second antenna, the signal strength of the harmonic wave is low. Accordingly, the effect of the harmonic wave on the signal reception processing by the second antenna is reduced.

DESCRIPTION OF EMBODIMENTS

First Embodiment

A communication device according to a first embodiment will be described with reference to FIGS. 1A to 4.

Figure 1A:
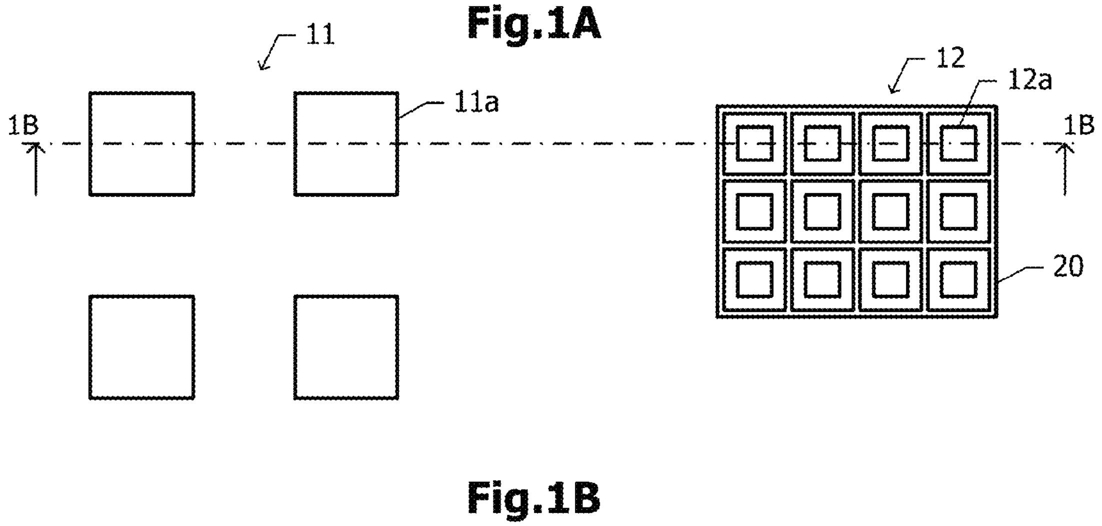
FIG. 1A is a plan view of an antenna device used in a communication device according to a first embodiment.
Figure 1B:
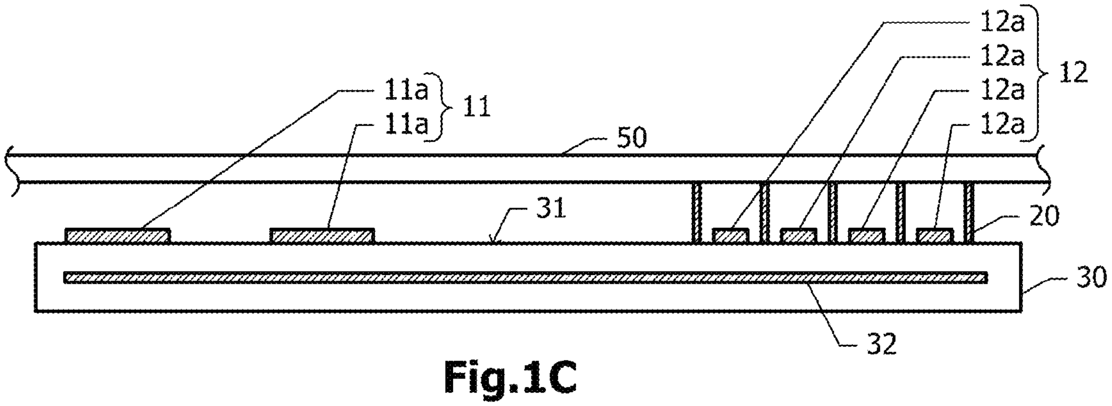
FIG. 1B is a sectional view taken along dot-dash line 1B-1B in FIG. 1A.
Figure 1C:
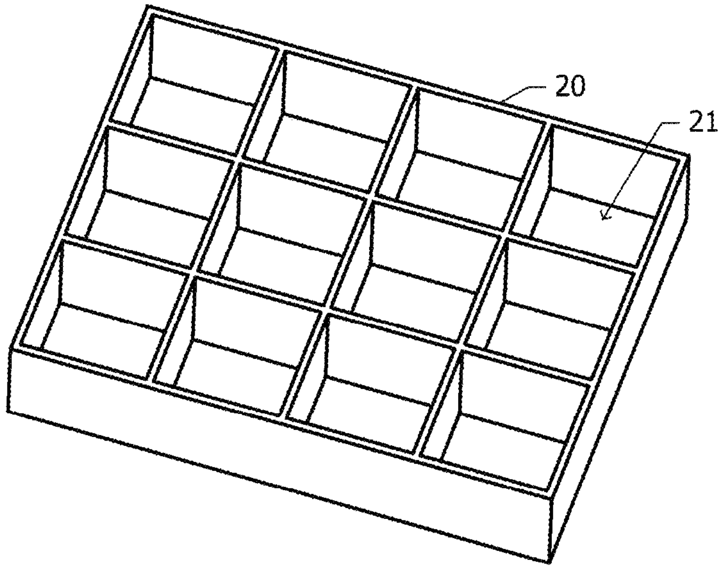
FIG. 1C is a perspective view of a waveguide structure included in the communication device according to the first embodiment.

FIG. 1A is a plan view of an antenna device used in the communication device according to the first embodiment. FIG. 1B is a sectional view taken along dot-dash line 1B-1B in FIG. 1A. FIG. 1C is a perspective view of a waveguide structure included in the communication device according to the first embodiment.

A first antenna 11 and a second antenna 12 are provided on a support surface 31, which is one surface of a module board 30 (FIG. 1B). The module board 30 also functions as a support member that supports the first antenna 11 and the second antenna 12. The first antenna 11 includes a plurality of first radiating elements 11*a* and the second antenna 12 includes a plurality of second radiating elements 12*a*. The module board 30 has a ground plane 32 therein.

A patch antenna includes the first radiating elements 11*a*, the second radiating elements 12*a*, and the ground plane 32. The first antenna 11 is an array antenna including the plurality of first radiating elements 11*a* and the second antenna 12 is an array antenna including the plurality of second radiating elements 12*a*. An operating frequency f2 of the second antenna 12 is higher than an operating frequency f1 of the first antenna 11. Here, the operating frequency of an antenna is defined as the frequency at which the antenna gain is maximized.

In a plan view, the plurality of first radiating elements 11*a* are disposed in, for example, a 2-by-2 matrix and the second radiating elements 12*a* are disposed in, for example, a 3-by-4 matrix.

Part of a housing 50 faces the support surface 31 of the module board 30 at a distance. A waveguide structure 20 is disposed between the support surface 31 of the module board 30 and the housing 50. The waveguide structure 20 is in contact with both the module board 30 and the housing 50. For example, the waveguide structure 20 is disposed outside the range of the half-value angle of the main beam as viewed from the first antenna 11 in the route of the radio waves received by the second antenna 12. The waveguide structure 20 is preferably disposed so as to contain the second antenna 12 without overlapping with the first antenna 11 in a plan view.

The waveguide structure 20 (FIG. 1C) includes metal walls disposed like a grid in a plan view. The plurality of second radiating elements 12*a* of the second antenna 12 are disposed so as to correspond to a plurality of cavities 21 of the grid-like metal walls. Specifically, the second radiating elements 12*a* are disposed inside the corresponding cavities 21 in a plan view. The relative positional relationship between the second radiating element 12*a* and the corresponding cavity 21 is the same for all the second radiating elements 12*a*.

Of the grid-like metal walls, the side walls of each of the plurality of cavities 21 function as one waveguide (referred to below as a unit waveguide) and cause radio waves with a desired wavelength to pass therethrough. In addition, the waveguide structure 20 functions as a reflector for radio waves with a wavelength sufficiently long for the dimensions of the cavity 21. Specifically, the waveguide structure 20 causes radio waves with the operating frequency of the second antenna 12 to pass therethrough and further attenuates radio waves with the operating frequency of the first antenna 11 than radio waves with the operating frequency of the second antenna 12.

Figure 2:
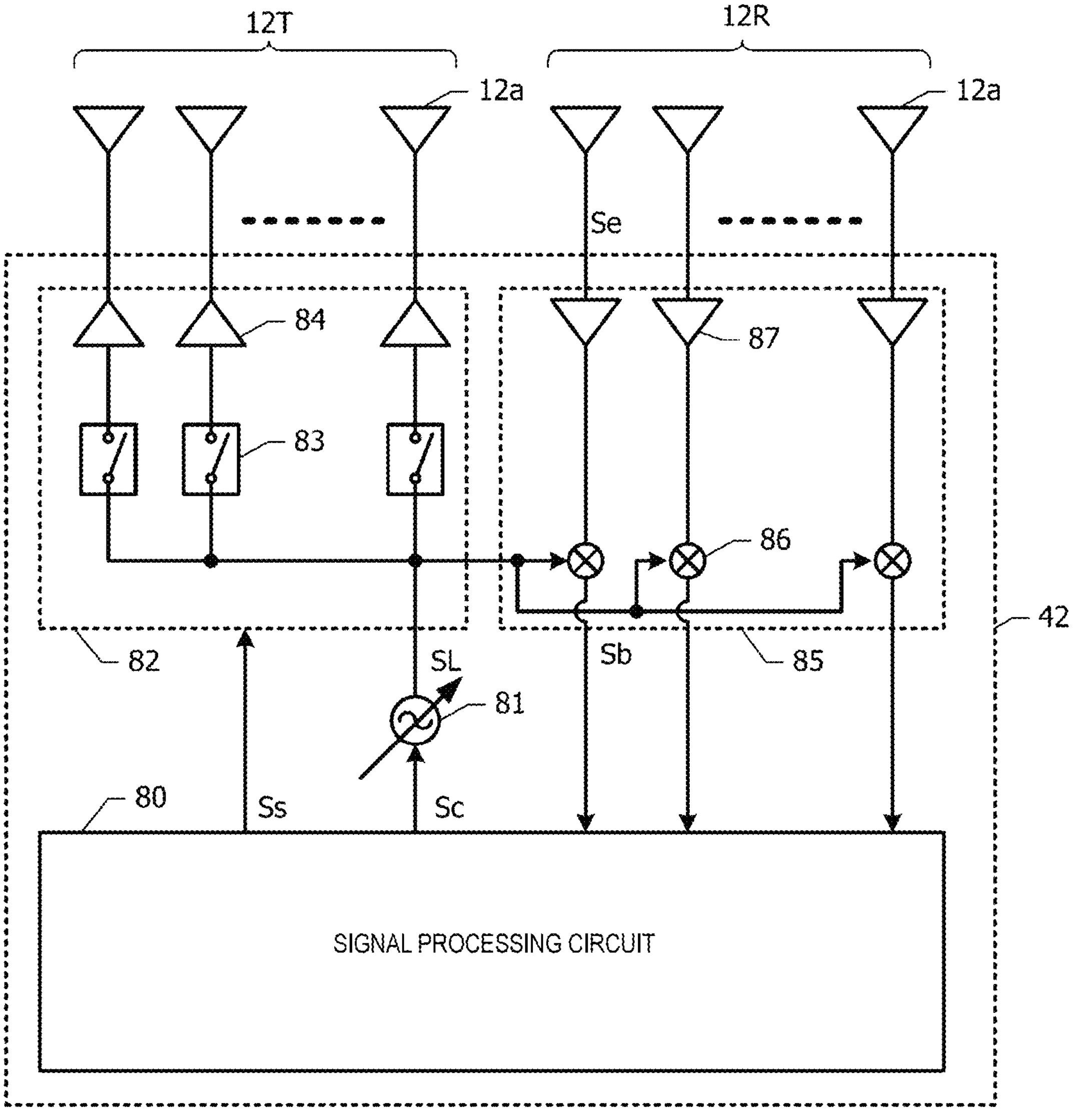
FIG. 2 is a block diagram of a radar function portion of the communication device according to the first embodiment.

FIG. 2 is a block diagram of a radar function portion of the communication device according to the first embodiment. This radar function portion includes the functions of time division multiple access (TDMA), frequency modulated continuous wave (FMCW), and multi-input multi-output (MIMO). Some of the plurality of second radiating elements 12*a* constitute a second antenna 12T for transmission and the other of the plurality of second radiating elements 12*a* constitute a second antenna 12R for reception.

A second transmit-receive circuit 42 supplies high frequency signals to the plurality of second radiating elements 12*a* of the second antenna 12T for transmission. The high frequency signals received by the plurality of second radiating elements 12*a* of the second antenna 12R for reception are input to the second transmit-receive circuit 42. The second transmit-receive circuit 42 includes a signal processing circuit 80, a local oscillator 81, transmission processing circuitry 82, and reception processing circuitry 85.

The local oscillator 81 outputs a local signal SL having a frequency that linearly increases or decreases over time based on a chirp control signal Sc from the signal processing circuit 80. The local signal SL is given to the transmission processing circuitry 82 and the reception processing circuitry 85.

The transmission processing circuitry 82 includes a plurality of switches 83 and a plurality of power amplifiers 84. The switch 83 and the power amplifier 84 are provided for each of the second radiating elements 12*a* that constitute the second antenna 12T for transmission. The switch 83 is turned on and off based on a switching control signal Ss from the signal processing circuit 80. The local signal SL is input to the power amplifier 84 when the switch 83 is on. The power amplifier 84 amplifies the power of the local signal SL and supplies the amplified power to the corresponding second radiating element 12*a*.

The radio waves emitted from the second antenna 12T for transmission are reflected by the target and the reflected waves are received by the second antenna 12R for reception.

The reception processing circuitry 85 includes a plurality of low noise amplifiers 87 and a plurality of mixers 86. The low noise amplifier 87 and the mixer 86 are provided for each of the second radiating elements 12*a* that constitute the second antenna 12R for reception. An echo signal Se received by the plurality of second radiating elements 12*a* that constitute the second antenna 12R for reception is amplified by the low noise amplifier 87. The mixer 86 multiplies the amplified echo signal Se by the local signal SL to generate a beat signal Sb.

The signal processing circuit 80 includes, for example, an AD converter, a microcomputer, and the like and calculates the distance and orientation to the target by performing signal processing on the beat signal Sb.

Figure 3:
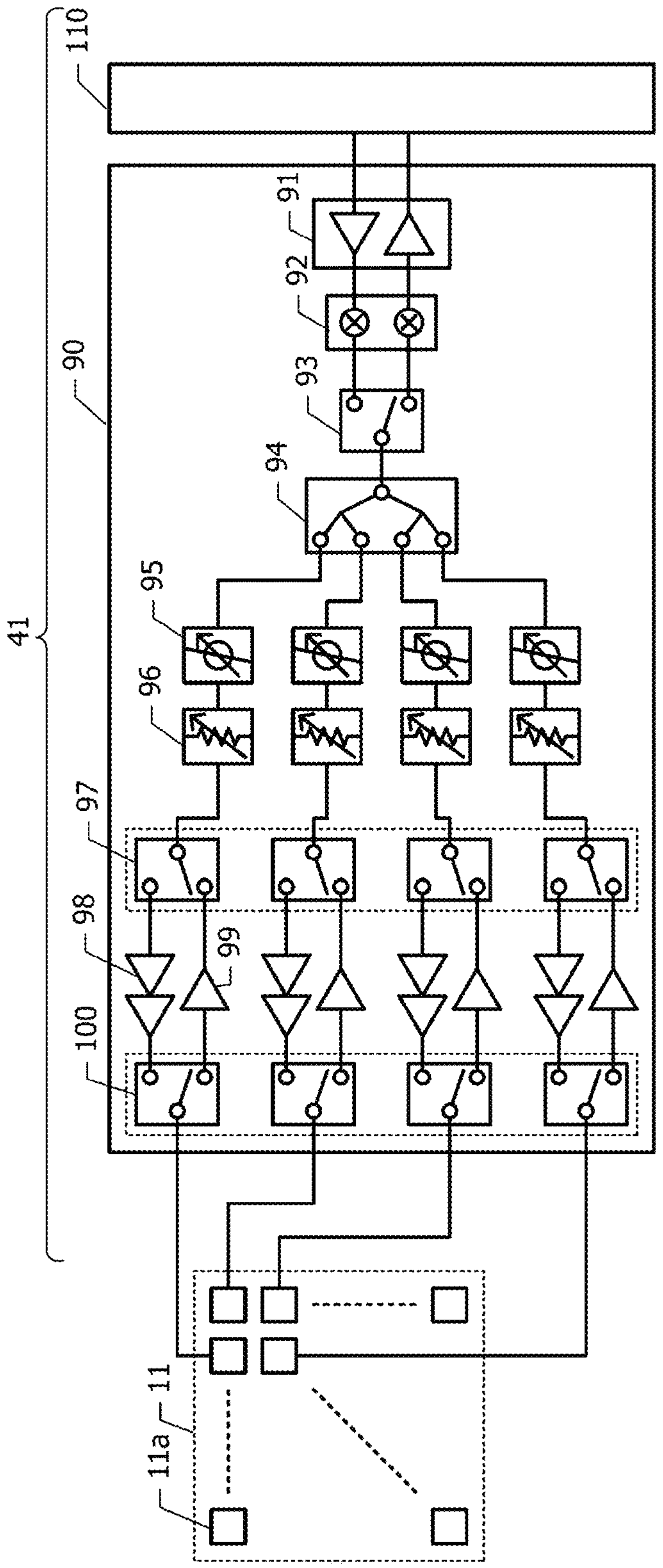
FIG. 3 is a block diagram of the communication function portion of the communication device according to the first embodiment.

FIG. 3 is a block diagram of the communication function portion of the communication device according to the first embodiment. The high frequency signal is supplied from a first transmit-receive circuit 41 to the first radiating elements 11*a* of the first antenna 11 and the high frequency signal received by the first radiating elements 11*a* is input to the first transmit-receive circuit 41.

The first transmit-receive circuit 41 includes a baseband integrated circuit device (BBIC) 110 and a high frequency integrated circuit device (RFIC) 90. The high frequency integrated circuit device 90 includes an intermediate frequency amplifier 91, an up-down conversion mixer 92, a transmit-receive toggle switch 93, a power divider 94, a plurality of phase shifters 95, a plurality of attenuators 96, and a plurality of transmit-receive toggle switches 97, a plurality of power amplifiers 98, a plurality of low noise amplifiers 99, and a plurality of transmit-receive toggle switches 100.

First, the transmission function will be described. An intermediate frequency signal is input from the baseband integrated circuit device 110 to the up-down conversion mixer 92 via the intermediate frequency amplifier 91. The high frequency signal generated by up-converting the intermediate frequency signal using the up-down conversion mixer 92 is input to the power divider 94 via the transmit-receive toggle switch 93. The high frequency signals divided by the power divider 94 are input to the first radiating elements 11*a* through the phase shifters 95, the attenuators 96, the transmit-receive toggle switches 97, the power amplifiers 98, and the transmit-receive toggle switches 100.

Next, the reception function will be described. The high frequency signals received by the plurality of first radiating elements 11*a* are input to the power divider 94 through the transmit-receive toggle switches 100, the low noise amplifiers 99, the transmit-receive toggle switches 97, the attenuators 96, and the phase shifters 95. The high frequency signal synthesized by the power divider 94 is input to the up-down conversion mixer 92 through the transmit-receive toggle switch 93. The intermediate frequency signal generated by down-converting the high frequency signal using the up-down conversion mixer 92 is input to the baseband integrated circuit device 110 through the intermediate frequency amplifier 91.

Next, the excellent effect of the first embodiment will be described with reference to FIG. 4.

Figure 4:
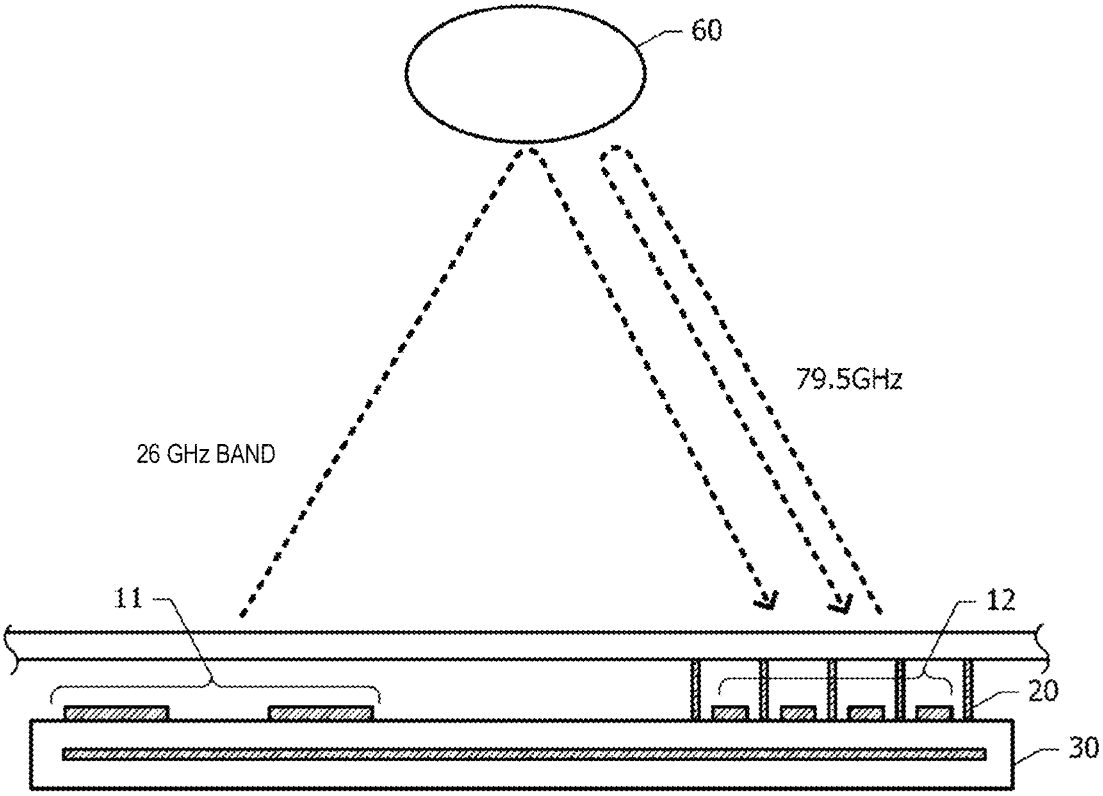
FIG. 4 is a schematic diagram of the communication device according to the first embodiment and a radio wave reflector present in a radio wave emission space of the communication device.

FIG. 4 is a schematic diagram of the communication device according to the first embodiment and a radio wave reflector present in a radio wave emission space of the communication device. A radio wave reflector 60 is present in the space to which the radio waves of the first antenna 11 and the second antenna 12 are emitted. The first antenna 11 is used by, for example, a fifth generation mobile communication system (5G communication system) and operates in the 26 GHz band. The second antenna 12 is used for, for example, a millimeter-wave radar and gesture sensor system and has an operating frequency of 79.5 GHz.

The waveguide structure 20 causes most of radio waves with a frequency of 79.5 GHz, which is the operating frequency of the second antenna 12, to pass therethrough and significantly attenuates radio waves in the operating frequency band of the first antenna 11. The radio waves emitted from the second antenna 12 are reflected by the radio wave reflector 60 and the reflected waves are received by the second antenna 12.

The radio waves emitted from the first antenna 11 are also reflected by the radio wave reflector 60 and the reflected waves enter the second antenna 12. The antenna gain of the second antenna 12 is maximized at the operating frequency 79.5 GHz thereof, but has some gain in the operating frequency band of the first antenna 11. Accordingly, the reflected waves of the radio waves in, for example, the 26 GHz band are also received by the second antenna 12. When a signal in the 26 GHz band is amplified by the low noise amplifier 87 of the second transmit-receive circuit 42 (FIG. 2), the harmonic wave is generated by the non-linearity of the low noise amplifier. The third harmonic wave of the signal in the 26 GHz band includes a signal with a frequency that matches 79.5 GHz or is close to 79.5 GHz. Accordingly, the third harmonic wave of the reception signal in the 26 GHz band becomes noise for the signal transmitted and received by the second antenna 12.

In the first embodiment, the waveguide structure 20 attenuates the radio waves that are emitted from the first antenna 11, are reflected by the radio wave reflector 60, and enter the second antenna 12, so the strength of the third harmonic wave generated by the non-linearity of the low noise amplifier is also reduced. Accordingly, it is possible to reduce the effect of noise caused by the radio waves emitted from the first antenna 11 on the signal transmitted and received by the second antenna 12.

Furthermore, in the first embodiment, the relative positional relationship between the plurality of second radiating elements 12*a* of the second antenna 12 and the corresponding cavities 21 of the waveguide structure 20 is the same for all the second radiating elements 12*a*. Accordingly, variation in the antenna gain between the individual second radiating elements 12*a* can be reduced.

Next, the attenuation required for the waveguide structure 20 will be described with reference to FIG. 5.

Figure 5:
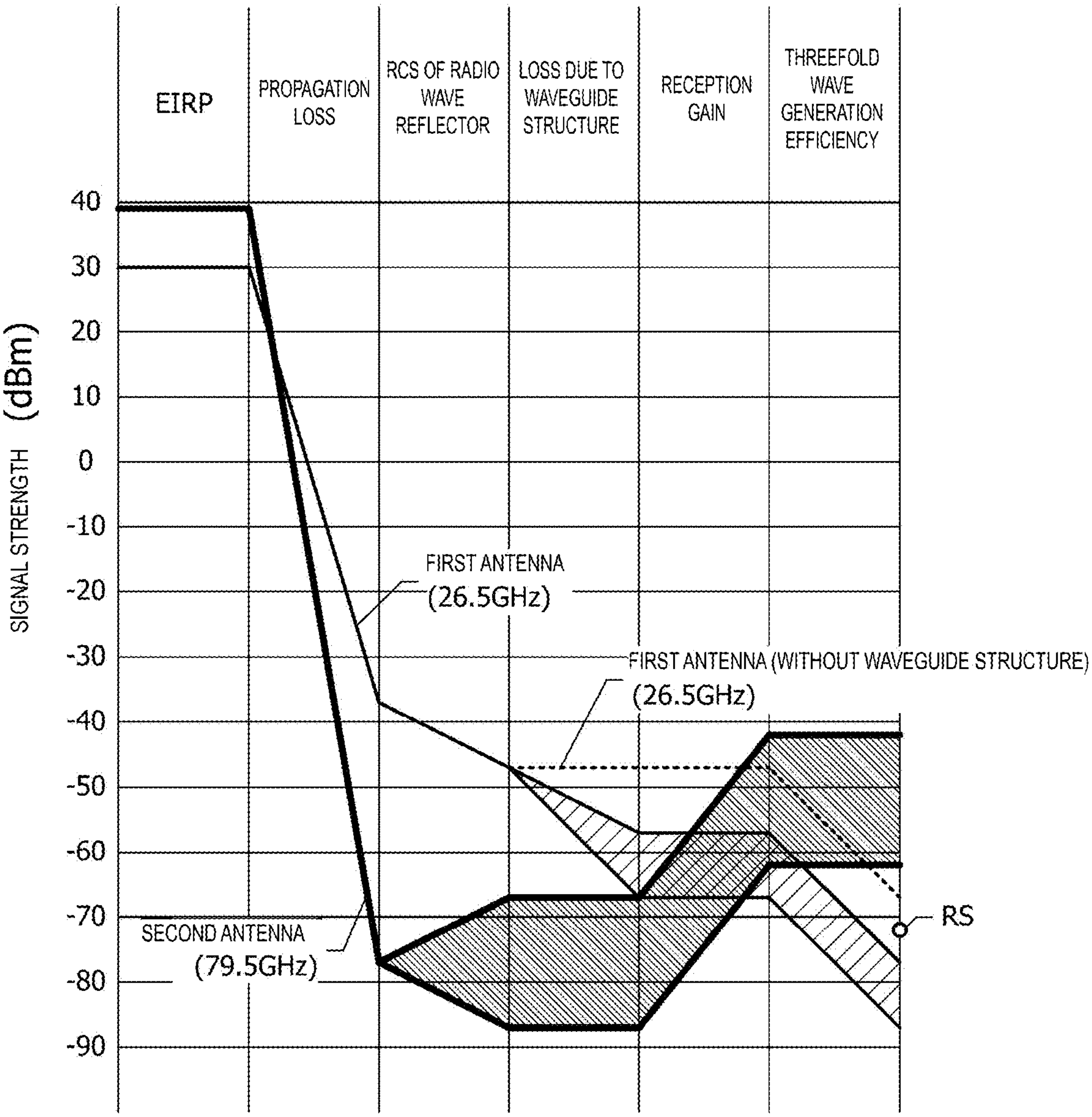
FIG. 5 is a graph illustrating an example of changes in the signal strength from emission from first and second antennas until detection by a second transmit-receive circuit through reflection by the radio wave reflector.

FIG. 5 is a graph illustrating an example of changes in the signal strength from emission from the first antenna 11 and the second antenna 12 until detection by the second transmit-receive circuit 42 (FIG. 2) through reflection by the radio wave reflector 60 (FIG. 4). The vertical axis represents the signal strength in units dBm.

The horizontal axis represents the equivalent isotropic radiated power (EIRP) of the antenna and the factors of changing the signal strength, that is, the propagation loss of radio waves, the loss caused by the radar scattering cross section (RCS) of the radio wave reflector, the propagation loss due to the waveguide structure 20 (FIGS. 1A and 1B), the reception gain of the antenna, and the generation efficiency of the third harmonic wave due to the non-linearity of the low noise amplifier.

FIG. 5 illustrates the case in which the second antenna 12 is provided for a millimeter wave radar with a frequency of 79.5 GHz and the first antenna 11 is provided for transmission and reception in the 26 GHz band of a 5G communication system. Radio waves with a frequency of 26.5 GHz included in the 26 GHz band are emitted from the first antenna 11 and radio waves with a frequency of 79.5 GHz are emitted from the second antenna 12. The frequency of the third harmonic wave emitted from the first antenna 11 is equal to the frequency of the fundamental wave emitted from the second antenna 12.

The thick solid lines in the graph in FIG. 5 represent fluctuations in the strength of the signal related to radio waves with a frequency of 79.5 GHz emitted from the second antenna 12. The relatively high-density hatched region represents the range of the strength of the signal related to radio waves with a frequency of 79.5 GHz emitted from the second antenna 12. The thin solid lines illustrate fluctuations in the strength of the signal related to radio waves with a frequency of 26.5 GHz emitted from the first antenna 11. The relatively low-density hatched region represents the range of the strength of the signal related to radio waves with a frequency of 26.5 GHz emitted from the first antenna 11. The dashed line illustrates the strength of the signal related to radio waves with a frequency of 26.5 GHz emitted from the first antenna 11 when the waveguide structure 20 is not disposed.

The EIRP of the fundamental wave of the first antenna 11 is assumed to be 30 dBm. In this case, for example, the EIRP of the third harmonic wave is approximately −4 dBm. The EIRP of radio waves with a frequency of 79.5 GHz emitted from the second antenna 12 used by the radar system needs to be set to be sufficiently higher than the EIRP of the third harmonic wave emitted from the first antenna 11. For example, the EIRP of a frequency of 79.5 GHz from the second antenna 12 is set to 39 dBm, which is sufficiently higher than −4 dBm.

First, the radar system including the second antenna 12 will be described. It is assumed that a patch array antenna in which in which eight traveling wave patch arrays are arranged in parallel is used as the second antenna 12. When the antenna gain is 25 dBi, the EIRP can be 39 dBm by setting the input power for one port to 5 dBm. When the radio wave reflector 100*m* away is detected, the round-trip distance of radio waves is 200 meters. This propagation loss is approximately 116 dB. Accordingly, the signal strength after occurrence of the propagation loss is −77 dBm. Furthermore, when the radar scattering cross section (RCS) of the radio wave reflector is assumed to be the range not less than −10 dB and not more than +10 dB, the signal strength in consideration of the RCS of the radio wave reflector is not less than −87 dBm and not more than −67 dBm.

Since almost all of radio waves with a frequency of 79.5 GHz pass through the waveguide structure 20, the loss due to the waveguide structure 20 is hardly caused. Accordingly, the signal strength after passing through the waveguide structure 20 is not less than −87 dBm and not more than −67 dBm. When the reception gain of the second antenna 12 is assumed to be 25 dBi, the signal strength of the reception signal by the second antenna 12 is not less than −62 dBm and not more than −42 dBm. Accordingly, the reception sensitivity RS of the second transmit-receive circuit 42 (FIG. 2) is preferably at least smaller than −62 dBm. The reception sensitivity RS is preferably set to approximately −72 dBm with a margin of approximately 10 dB.

Next, the effect of the radio waves emitted from the first antenna 11 for a 5G communication system on the radar system will be described. The signal strength of the third harmonic wave of the fundamental wave with a frequency of 26.5 GHz emitted from the first antenna 11 needs to be smaller than the reception sensitivity RS of the radar system, that is, −72 dBm to prevent this harmonic wave from affecting the radar system.

The EIRP with a frequency of 26.5 GHz from the first antenna 11 is assumed to be, for example, 30 dBm as described above. For example, when the radio waves are emitted from the first antenna 11, are reflected by the radio wave reflector disposed 1 meter away, and enter the second antenna 12, the propagation loss for a 2-meter round trip is approximately 67 dB. Accordingly, the signal strength after occurrence of the propagation loss is −37 dBm. When the RCS of an obstacle is approximately −10 dB, the signal strength in consideration of the RCS of the obstacle is −47 dBm.

First, the case in which the waveguide structure 20 is not disposed will be described. When the reception gain of the second antenna 12 at 79.5 GHz is 25 dBi, the reception gain at 26.5 GHz is smaller than 25 dBi. For example, the reception gain at 26.5 GHz is 0 dBi. At this time, the signal strength of the reception signal with a frequency of 26.5 GHz received by the second antenna 12 is −47 dBm. When the third harmonic wave generation efficiency due to the non-linearity of the low noise amplifier is assumed to be −20 dB, the signal strength of the third harmonic wave at a frequency of 79.5 GHz after passing through the low noise amplifier is −67 dBm.

Since this signal strength is larger than the reception sensitivity RS, that is, −72 dBm, the third harmonic wave is detected as a valid signal by the radar system. Accordingly, the radio waves with a frequency of 26.5 GHz received by the second antenna 12 must be attenuated by the waveguide structure 20 before reception.

In order to make the signal strength of the third harmonic wave lower than the reception sensitivity RS, the attenuation is preferably approximately 10 dB and more preferably approximately 20 dB with a margin as indicated by the thin solid lines in FIG. 5. By attenuating radio waves with a frequency of 26.5 GHz by 10 dB using the waveguide structure 20, the signal strength of the third harmonic wave can be made lower than the reception sensitivity RS of the radar system. Furthermore, by attenuating radio waves with a frequency of 26.5 GHz by 20 dB using the waveguide structure 20, the signal strength of the third harmonic wave can be made sufficiently lower than the reception sensitivity RS of the radar system.

Although the example illustrated in FIG. 5 introduces various assumptions, these assumptions reflect the utilization situations in actual radar systems and 5G communication systems. Accordingly, in general, the attenuation of radio waves with the operating frequency of the first antenna 11 by the waveguide structure 20 is preferably larger than or equal to 10 dB and more preferably larger than or equal to 20 dB. The attenuation of radio waves by the waveguide structure 20 can be adjusted by changing the height (corresponding to the length of the waveguide) of the waveguide structure 20.

Second Embodiment

Next, a communication device according to a second embodiment will be described with reference to FIG. 6A. The structure common to the communication device (FIGS. 1A, 1B, and 1C) according to the first embodiment will not be described below.

Figure 6A:
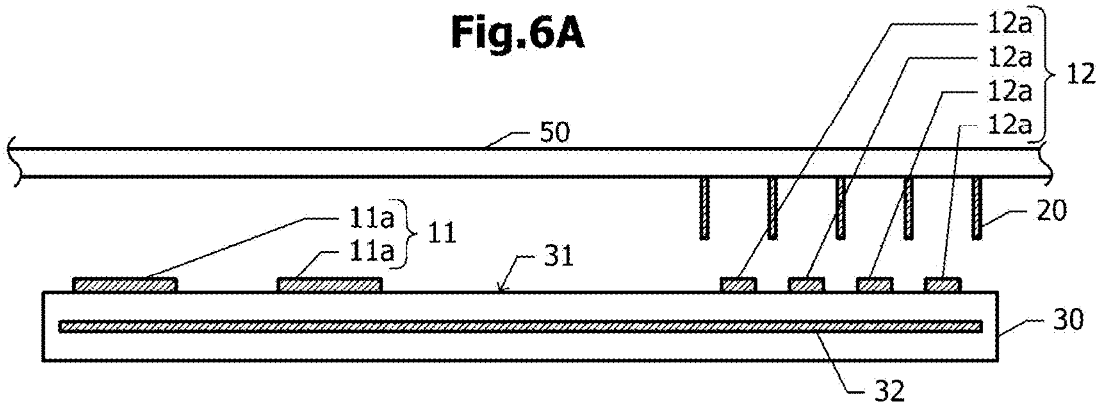
FIG. 6A is a sectional view of a communication device according to a second embodiment and FIG. 6B is a sectional view of a communication device according to a modification of the second embodiment.

FIG. 6A is a sectional view of the communication device according to the second embodiment. In the communication device according to the first embodiment, the waveguide structure 20 (FIG. 1B) is in contact with both the module board 30 and the housing 50. In contrast, in the second embodiment, the waveguide structure 20 is fixed to the housing 50 with an adhesive and not in contact with the module board 30. It should be noted that the housing 50 and the waveguide structure 20 may also be manufactured by insert molding.

The plurality of second radiating elements 12*a* of the second antenna 12 are aligned with the waveguide structure 20 when the module board 30 is installed in the housing 50. This makes the positional relationship between the plurality of second radiating elements 12*a* and the waveguide structure 20 in a plan view identical to that in the first embodiment.

Next, a communication device according to a modification of the second embodiment will be described with reference to FIG. 6B.

Figure 6B:
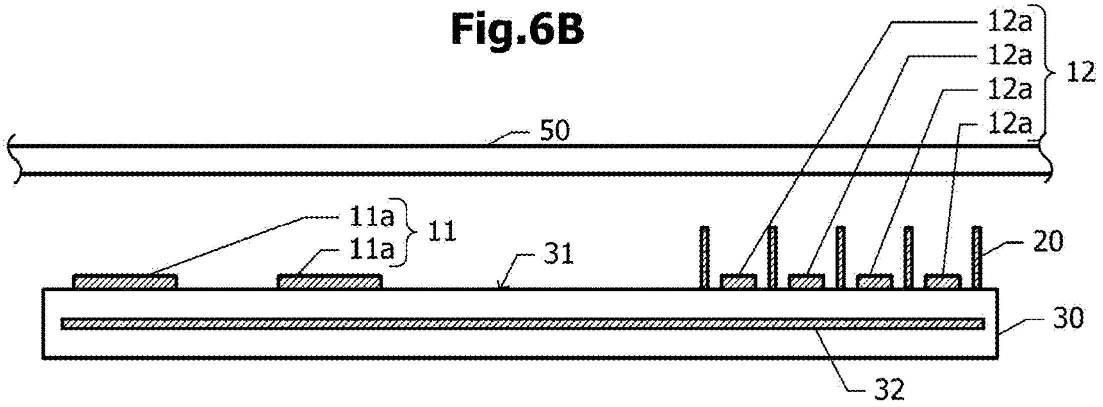

FIG. 6B is a sectional view of the communication device according to the modification of the second embodiment. In the modification, the waveguide structure 20 is fixed to the module board 30 with an adhesive and not in contact with the housing 50.

Even in the structure in which the waveguide structure 20 is not in contact with one of the module board 30 and the housing 50 as in the second embodiment or the modification of the second embodiment, the same excellent effect as in the first embodiment can be obtained.

Third Embodiment

Next, a communication device according to a third embodiment will be described with reference to FIGS. 7A and 7B. The structure common to the communication device (FIGS. 1A, 1B, and 1C) according to the first embodiment will not be described below.

Figure 7A:
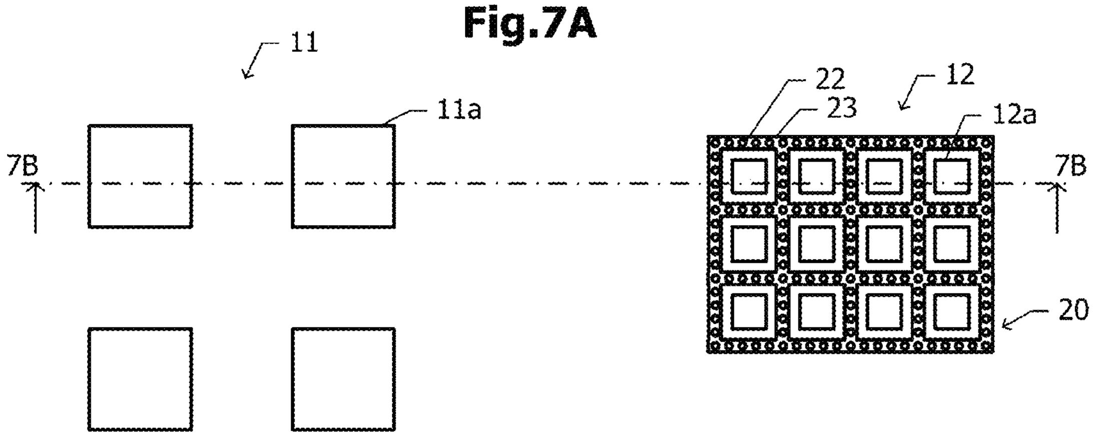
FIG. 7A is a plan view of an antenna device used in a communication device according to a third embodiment and FIG. 7B is a sectional view of the communication device taken along dot-dash line 7B-7B in FIG. 7A.
Figure 7B:
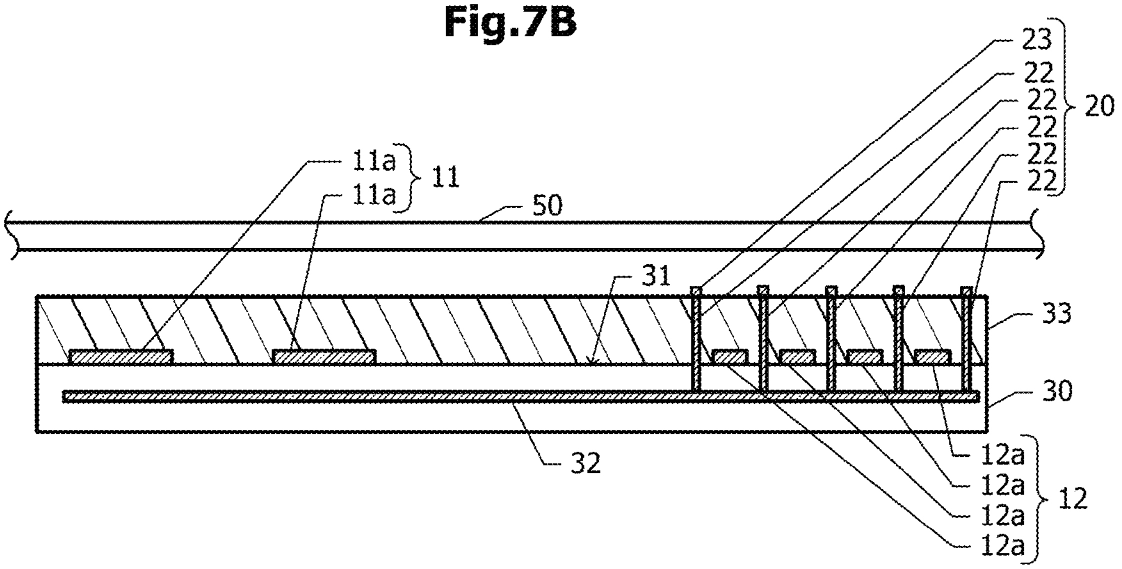

FIG. 7A is a plan view of an antenna device used in the communication device according to the third embodiment and FIG. 7B is a sectional view taken along dot-dash line 7B-7B in FIG. 7A. In the first embodiment, the waveguide structure 20 (FIGS. 1A and 1C) includes the grid-like metal walls. In contrast, in the third embodiment, the waveguide structure 20 includes a plurality of conductor pillars 22 and a grid-like conductor pattern 23.

A dielectric film 33 that covers the first antenna 11 and the second antenna 12 is disposed on the support surface 31 of the module board 30. The plurality of conductor pillars 22 disposed along the grid-like straight lines in a plan view are embedded in the dielectric film 33. The second radiating elements 12*a* of the second antenna 12 are disposed in the space portions between the plurality of grid-like straight lines including the plurality of conductor pillars 22, respectively.

The upper ends of the plurality of conductor pillars 22 are exposed to the upper surface of the dielectric film 33. The conductor pattern 23 is disposed on the dielectric film 33 so as to pass through the upper ends of the conductor pillars 22 exposed to the upper surface of the dielectric film 33 and the conductor pattern 23 electrically connects the upper ends of the plurality of conductor pillars 22 to each other. The lower ends of the plurality of conductor pillars 22 reach the ground plane 32 in the module board 30 and are electrically connected to the ground plane 32. The spacing between the plurality of conductor pillars 22 is set so that the spaces corresponding to the cavities of the grid formed by the plurality of conductor pillars 22 function as a waveguide for radio waves with the operating frequency of the first antenna 11. For example, the spacing between the plurality of conductor pillars 22 is set to ¼ or less of the wavelength in the dielectric film 33 of the radio waves with the operating frequency of the second antenna 12. The plurality of conductor pillars 22 disposed so as to surround one second radiating element 12*a* in a plan view and the conductor pattern 23 that electrically connects the upper ends of the conductor pillars 22 function as the unit waveguide corresponding to the one second radiating element 12*a*.

Next, the excellent effect of the third embodiment will be described.

In the third embodiment as well, the waveguide structure 20 attenuates the radio waves in the operating frequency band of the first antenna 11, so the same excellent effect as in the first embodiment can be obtained. The attenuation of radio waves is larger as the height to the upper end of the waveguide structure 20 from the support surface 31 is larger. In the third embodiment, the cavities 21 of the waveguide structure 20 are filled with the dielectric film 33 with a dielectric constant higher than that in air. Accordingly, the substantial length related to radio wave propagation from the support surface 31 to the upper end of the waveguide structure 20 is longer than that when the cavities 21 are hollow. As a result, the excellent effect of increasing the attenuation of radio waves by the waveguide structure 20 can be obtained.

Next, modifications of the third embodiment will be described. Although the plurality of conductor pillars 22 are connected to the ground plane 32 in the third embodiment, the plurality of conductor pillars 22 do not need to be connected to the ground plane 32. In addition, although the upper ends of the plurality of conductor pillars 22 are connected to each other by the conductor pattern 23 in the third embodiment, the plurality of conductor pillars 22 may be electrically connected to each other by the grid-like conductor pattern of an internal layer in the middle portions between the upper ends and the lower ends of the plurality of conductor pillars 22 as well. By connecting the plurality of conductor pillars 22 to each other in the middle portions, the function as the unit waveguide can be enhanced.

Fourth Embodiment

Next, a communication device according to a fourth embodiment will be described with reference to FIG. 8. The structure common to the communication device (FIGS. 1A, 1B, and 1C) according to the first embodiment will not be described below.

Figure 8:
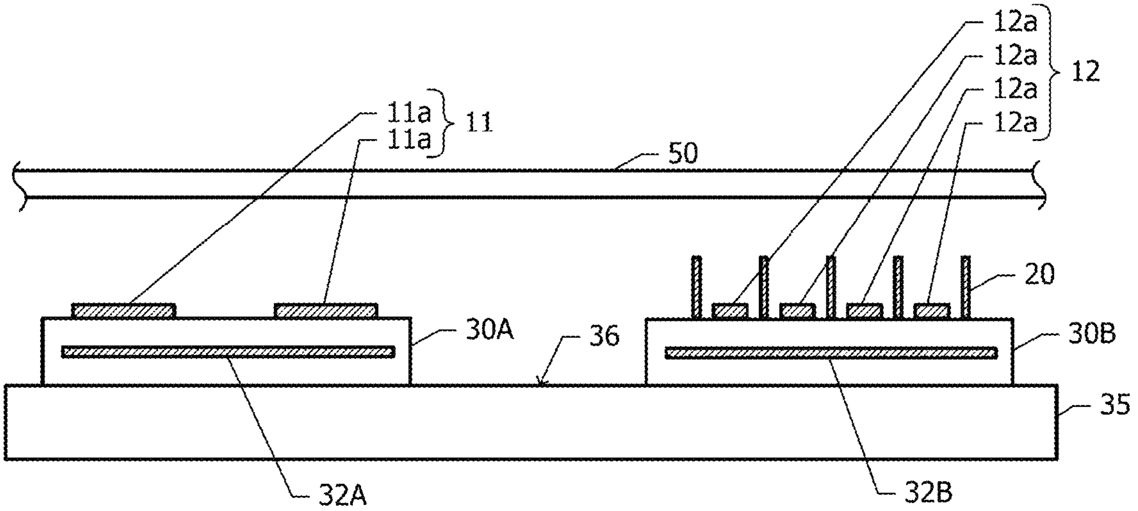
FIG. 8 is a sectional view of a communication device according to a fourth embodiment.

FIG. 8 is a sectional view of the communication device according to the fourth embodiment. In the first embodiment, the first antenna 11 and the second antenna 12 are provided on the common module board 30 (FIG. 1B) and the module board 30 is used as the support member that supports the first antenna 11 and the second antenna 12. In contrast, in the fourth embodiment, the first antenna 11 and the second antenna 12 are formed on a first module board 30A and a second module board 30B, which are different from each other, respectively. The first module board 30A and the second module board 30B internally have a ground plane 32A and a ground plane 32B, respectively. The waveguide structure 20 is fixed to the second module board 30B.

The first module board 30A and the second module board 30B are fixed to a support surface 36 of a common support member 35. The support member 35 is housed in the housing 50 and fixed to the housing.

Next, the excellent effect of the fourth embodiment will be described. In the fourth embodiment as well, the same excellent effect as in the first embodiment can be obtained by disposing the waveguide structure 20. In addition, the first antenna 11 and the second antenna 12 are formed on different module boards in the fourth embodiment, so the degree of flexibility in the arrangement of both antennas increases.

Fifth Embodiment

Next, a communication device according to a fifth embodiment will be described with reference to FIGS. 9A and 9B. The structure common to the communication devices according to the first embodiment (FIG. 1A) and the second embodiment (FIG. 6A) will not be described below.

Figure 9A:
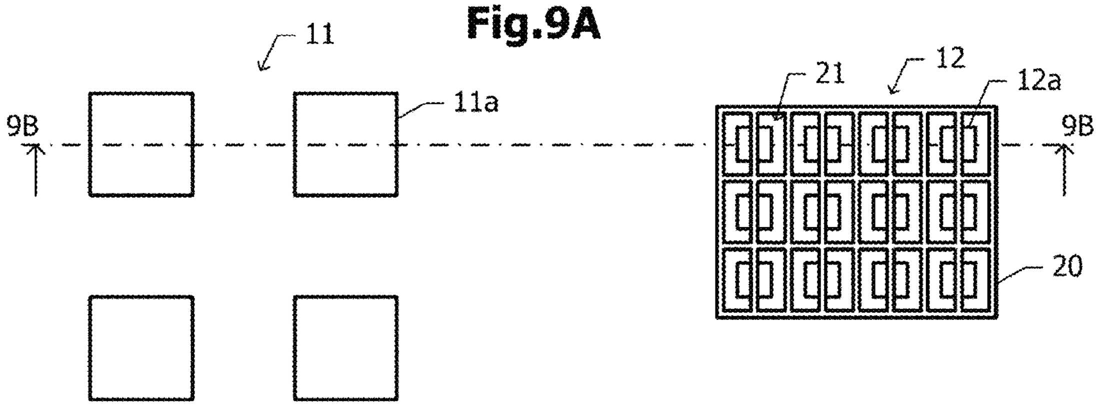
FIG. 9A is a plan view of a communication device according to a fifth embodiment and FIG. 9B is a sectional view taken along dot-dash line 9B-9B in FIG. 9A.
Figure 9B:
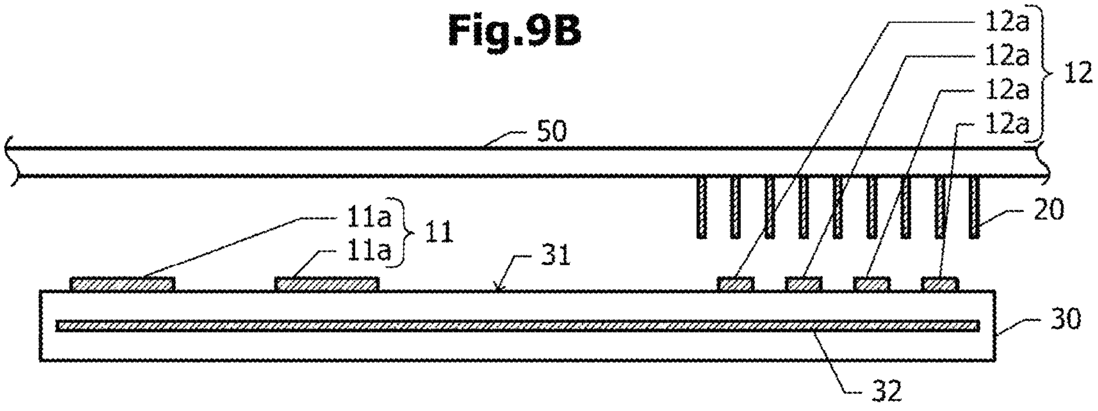

FIG. 9A is a plan view of the communication device according to the fifth embodiment and FIG. 9B is a sectional view taken along dot-dash line 9B-9B in FIG. 9A. In the first embodiment (FIG. 1A), the plurality of cavities 21 of the grid-like metal walls constituting the waveguide structure 20 correspond one-to-one to the plurality of second radiating elements 12*a* of the second antenna 12. In contrast, in the fifth embodiment, two cavities of the grid-like metal walls constituting the waveguide structure 20 correspond to one second radiating element 12*a*. That is, two unit waveguides are disposed for one second radiating element 12*a*. In a plan view, the straight line portions of the metal walls that extend in the column direction (vertical direction in FIG. 9A) pass through the middles of the second radiating elements 12*a*, respectively.

In the fifth embodiment as well, the waveguide structure 20 attenuates the radio waves with the basic frequency emitted from the first antenna 11, as in the first embodiment and the second embodiment. The radio waves with the frequency transmitted or received by the second antenna 12 are hardly attenuated by the waveguide structure 20.

Next, the excellent effect of the fifth embodiment will be described. In the fifth embodiment as well, the radio waves with the fundamental frequency that are emitted from the first antenna 11, are reflected by the radio wave reflector 60 (FIG. 4), and enter the second antenna 12 are attenuated by the waveguide structure 20, as in the first embodiment and the second embodiment. Accordingly, the signal with the fundamental frequency input to the low noise amplifier 87 (FIG. 2) is weakened. As a result, the signal strength of the harmonic wave component generated by the non-linearity of the low noise amplifier 87 also reduces. Accordingly, the effect of the noise caused by the radio waves emitted from the first antenna 11 on the signal transmitted and received by the second antenna 12 can be reduced.

Furthermore, in the fifth embodiment as well, the relative positional relationship between the plurality of unit waveguides included in the waveguide structure 20 and the plurality of second radiating elements 12*a* of the second antenna 12 is the same for all the second radiating elements 12*a*. Accordingly, the variation in the antenna gain between the individual second radiating elements 12*a* can be reduced.

In the fifth embodiment, the upper and lower edges of the four edges of the second radiating element 12*a* of the second antenna 12 intersect with the metal wall and the left and right edges do not intersect with the metal wall in FIG. 9A. In this case, the second radiating element 12*a* is preferably excited so that the edges that do not intersect with the metal wall become the wave source. That is, in FIG. 9A, the polarization direction of the second radiating element 12*a* is preferably the left-right direction.

Next, modifications of the fifth embodiment will be described.

In the fifth embodiment, in a plan view, the straight line portions of the metal walls that extend in the column direction pass through the middles of the second radiating elements 12*a*, but the straight line portions that extend in the row direction of the metal walls may pass through the middles of the second radiating elements 12*a*. In addition, one second radiating element 12*a* corresponds to two unit waveguides in the fifth embodiment, but one second radiating element 12*a* may correspond to three or more unit waveguides.

Sixth Embodiment

Next, a communication device according to a sixth embodiment will be described with reference to FIGS. 10A and 10B. The structure common to the communication device (FIGS. 9A and 9B) according to the fifth embodiment will not be described below.

Figure 10A:
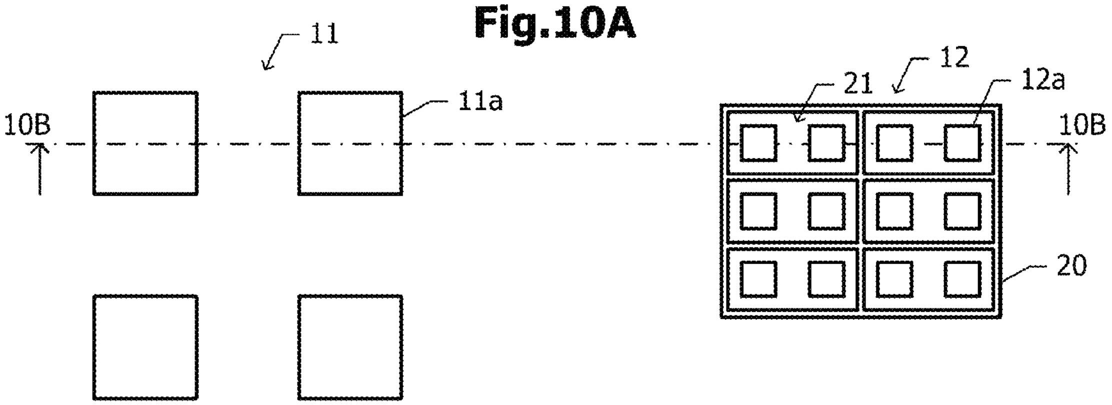
FIG. 10A is a plan view of a communication device according to a sixth embodiment and FIG. 10B is a sectional view taken along dot-dash line 10B-10B in FIG. 10A.
Figure 10B:
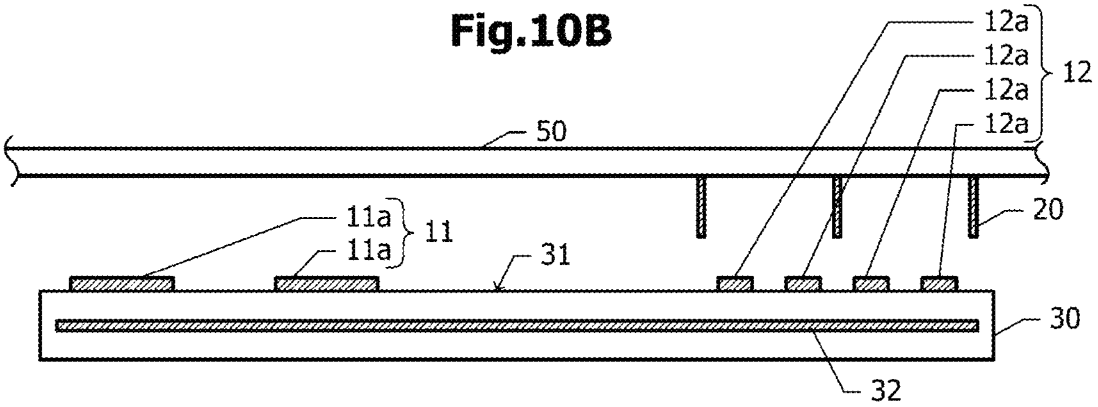

FIG. 10A is a plan view of the communication device according to the sixth embodiment and FIG. 10B is a sectional view taken along dot-dash line 10B-10B in FIG. 10A. In the fifth embodiment, one second radiating element 12*a* corresponds to two unit waveguides. In contrast, in the sixth embodiment, two second radiating elements 12*a* correspond to one unit waveguide. Specifically, one unit waveguide is disposed for two second radiating elements 12*a* arranged in the row direction. The shape of each of the unit waveguides in a plan view is a rectangle with long sides in the row direction, and one unit waveguide contains two second radiating elements 12*a* in a plan view.

In the sixth embodiment as well, the waveguide structure 20 attenuates the radio waves with the basic frequency emitted from the first antenna 11, as in the fifth embodiment. The radio waves with the frequency transmitted or received by the second antenna 12 are hardly attenuated by the waveguide structure 20.

Next, the excellent effect of the sixth embodiment will be described. In the sixth embodiment as well, the effect of the noise caused by the radio waves emitted from the first antenna 11 on the signal transmitted and received by the second antenna 12 can be reduced as in the fifth embodiment.

Next, a modification of the sixth embodiment will be described. Although one unit waveguide corresponds to two second radiating elements 12*a* in the sixth embodiment, one unit waveguide may correspond to three or more second radiating elements 12*a*. For example, in a plan view, one unit waveguide may contain three or more second radiating elements 12*a*.

Seventh Embodiment

Next, a communication device according to a seventh embodiment will be described with reference to FIGS. 11A and 11B. The structure common to the communication devices (FIGS. 1A to 5) according to the first embodiment will not be described below.

Figure 11A:
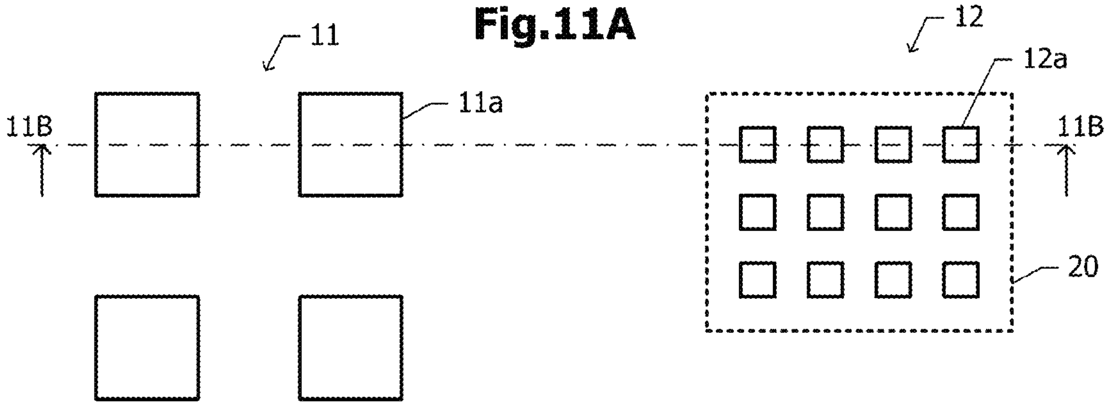
FIG. 11A is a plan view of a communication device according to a seventh embodiment and FIG. 11B is a sectional view taken along dot-dash line 11B-11B in FIG. 11A.
Figure 11B:
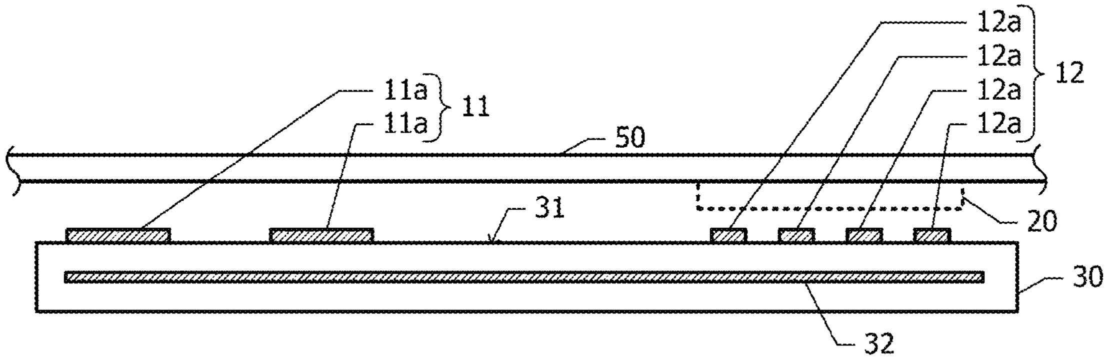

FIG. 11A is a plan view of the communication device according to the seventh embodiment and FIG. 11B is a sectional view taken along dot-dash line 11B-11B in FIG. 11A. The communication device according to the seventh embodiment includes the waveguide structure 20 having a unit waveguide disposed in the route of the radio waves received by the second antenna 12, as in the first embodiment. In addition, the waveguide structure 20 is disposed outside the range of the half-value angle of the main beam as viewed from the first antenna 11. It is possible to use, as the waveguide structure 20, a structure having a waveguide function that further attenuates the radio waves with the operating frequency of the first antenna 11 than the radio waves with the operating frequency of the second antenna 12.

Next, the excellent effect of the seventh embodiment will be described. In the seventh embodiment as well, the effect of the noise caused by the radio waves emitted from the first antenna 11 on the signal transmitted and received by the second antenna 12 can be reduced, as in the first embodiment.

It goes without saying that each of the above-described embodiments is exemplary and the structures described in different embodiments can be partially replaced or combined with each other. Similar advantageous effects provided by similar structures in a plurality of embodiments are not mentioned sequentially in each of the embodiments. Further, the present disclosure is not limited to the above-described embodiments. It is obvious for those skilled in the art that various alterations, improvements, combinations, and the like can be made.

The invention claimed is:

1. A communication device comprising:

a first antenna having a first operating frequency;

a second antenna that is an array antenna including a plurality of radiating elements, the second antenna having a second operating frequency that is greater than the first operating frequency; and a waveguide structure, wherein the first antenna, the second antenna, and the waveguide structure are contained in a single housing, and the waveguide structure is outside a range of a half-value angle of a main beam as viewed from the first antenna, includes a unit waveguide disposed in a path of a radio wave received by the second antenna, and is configured to attenuate a radio wave in the first operating frequency.

2. The communication device of claim 1, wherein the waveguide structure includes a plurality of unit waveguides.

3. The communication device of claim 2, wherein the plurality of unit waveguides are disposed so as to correspond to the plurality of radiating elements of the second antenna, respectively.

4. The communication device of claim 1, further comprising:

a support member that supports the first antenna and the second antenna on a support surface.

5. The communication device of claim 1, wherein the waveguide structure does not overlap with the first antenna and contains the second antenna in a plan view.

6. The communication device of claim 3, wherein the waveguide structure includes metal walls disposed in a grid pattern in a plan view.

7. The communication device of claim 6, wherein portions of the metal walls that surround a plurality of cavities formed by the metal walls disposed like a grid constitute each of the plurality of unit waveguides.

8. The communication device of claim 4, wherein part of the housing faces the support surface and the waveguide structure is fixed to the housing.

9. The communication device of claim 4, wherein the waveguide structure is fixed to the support member.

10. The communication device of claim 4, further comprising:

a dielectric film disposed on the support surface and that covers the second antenna.

11. The communication device of claim 10, wherein the waveguide structure includes a plurality of conductor pillars embedded in the dielectric film.

12. The communication device of claim 11, wherein the plurality of conductor pillars are disposed along straight lines disposed in a grid pattern in a plan view.

13. The communication device of claim 12, wherein the plurality of conductor pillars that surround the plurality of cavities disposed in the grid pattern including the plurality of conductor pillars constitute the unit waveguides.

14. The communication device of claim 11, wherein the waveguide structure includes a conductor pattern that connects the plurality of conductor pillars to each other.

15. The communication device of claim 14, wherein the conductor pattern is disposed so as not to overlap with the plurality of radiating elements of the second antenna in a plan view.

16. The communication device of claim 1, wherein the first operating frequency is in the 26 GHz band, and the second operating frequency is 79.5 GHz.

17. A communication device comprising:

a first antenna having a first operating frequency;

a second antenna that is an array antenna including a plurality of radiating elements, the second antenna having a second operating frequency that is greater than the first operating frequency; and a waveguide structure including a plurality of metals walls disposed in a grid pattern when viewed in a plan view, wherein portions of the metals walls that surround a plurality of cavities formed by the metal walls constitute each of a plurality of unit waveguides, each of the plurality of unit waveguides are disposed so as to respectively correspond to each of the plurality of radiating elements of the second antenna, and the first antenna, the second antenna, and the waveguide structure are contained in a single housing.

18. The communication device of claim 17, wherein the waveguide structure is outside a range of a half-value angle of a main beam as viewed from the first antenna.

19. The communication device of claim 17, wherein the waveguide structure is configured to attenuate a radio wave in the first operating frequency.

20. A communication device comprising:

a first antenna having a first operating frequency;

a second antenna that is an array antenna including a plurality of radiating elements, the second antenna having a second operating frequency that is greater than the first operating frequency;

a support member that supports the first antenna and the second antenna on a support surface; and a waveguide structure that extends a distance between the support surface and a surface of a housing, wherein the first antenna, the second antenna, the support member and the waveguide structure are contained in the housing, and the waveguide structure is outside a range of a half-value angle of a main beam as viewed from the first antenna, includes a unit waveguide disposed in a path of a radio wave received by the second antenna, and is configured to attenuate a radio wave in the first operating frequency.

* * * * *